US009979637B2

(12) United States Patent
Hughes et al.

(10) Patent No.: US 9,979,637 B2
(45) Date of Patent: May 22, 2018

(54) NETWORK FLOW MANAGEMENT SYSTEM

(71) Applicant: Dell Products L.P., Round Rock, TX (US)

(72) Inventors: Kevin Allen Hughes, Cedar Park, TX (US); Rabah S. Hamdi, Spring, TX (US)

(73) Assignee: Dell Products L.P., Round Rock, TX (US)

( * ) Notice: Subject to any disclaimer, the term of this patent is extended or adjusted under 35 U.S.C. 154(b) by 171 days.

(21) Appl. No.: 15/175,834

(22) Filed: Jun. 7, 2016

(65) Prior Publication Data
US 2017/0353383 A1 Dec. 7, 2017

(51) Int. Cl.
H04L 12/56 (2006.01)
H04L 12/721 (2013.01)
H04L 12/751 (2013.01)
H04L 12/715 (2013.01)

(52) U.S. Cl.
CPC ............. H04L 45/38 (2013.01); H04L 45/02 (2013.01); H04L 45/64 (2013.01)

(58) Field of Classification Search
CPC ......... H04L 45/02; H04L 45/38; H04L 45/64; H04L 45/5067; H04L 45/5019; H04L 45/0681; H04L 45/0893; H04L 47/10; H04L 47/20; H04L 41/0893; H04L 43/0817; H04L 43/026
USPC ........................................................ 370/254
See application file for complete search history.

(56) References Cited

U.S. PATENT DOCUMENTS

| 8,180,558 B1 * | 5/2012 | Marko ................. G08G 1/0112 340/936 |
| 8,503,307 B2 | 8/2013 | Tourrilhes et al. |
| 8,837,288 B2 | 9/2014 | Hamdi et al. |
| 9,077,658 B2 * | 7/2015 | Hamdi .................. H04L 47/193 |

(Continued)

FOREIGN PATENT DOCUMENTS

CN 104168144 11/2014

OTHER PUBLICATIONS

Jain, et al., "B4: Experience with a Globally-Deployed Software Defined WAN", 2013, ACM, 12 pgs.

(Continued)

Primary Examiner — Afsar M Qureshi
(74) Attorney, Agent, or Firm — Haynes and Boone, LLP

(57) ABSTRACT

A network flow management system includes controllers that are each coupled to a subset of switch devices, and a flow management server system that is coupled to each of the controllers. The flow management server system collects first-level flow information for the switch devices from the controllers, and filters and structures the first-level flow information to generate second-level flow information. The flow management server system then analyzes the second-level flow information based on current flow operation policies that are configured to cause the switch devices to perform first flow operations and, in response, determines flow operation policy changes. The flow management server system then distributes updated flow operation policies that includes the flow operation policy changes to each of the controllers, where the updated flow operation policies cause the switch devices to perform second flow operation that are different than the first flow operations.

20 Claims, 13 Drawing Sheets

(56) References Cited

U.S. PATENT DOCUMENTS

| | | |
|---|---|---|
| 2006/0075093 A1 | 4/2006 | Frattura et al. |
| 2009/0100506 A1* | 4/2009 | Whang ............... H04L 41/0893 726/4 |
| 2010/0188976 A1* | 7/2010 | Rahman ................ H04L 47/10 370/235 |
| 2012/0054330 A1* | 3/2012 | Loach .................... H04L 47/17 709/224 |
| 2015/0319085 A1 | 11/2015 | Hamdi et al. |

OTHER PUBLICATIONS

Rakesh Saha and Amit Agarwal, "*SDN Approach to Large Scale Global Data Centers*", http://opennetsummit.org/archives/apr12/agarwal-saha-mon-datacenters.pdf—2012.

"*A Coordinated Virtual Infrastructure for SDN in Enterprise Networks*", White Papers, 2013, Aclatel-Lucent, 11 pgs.

\* cited by examiner

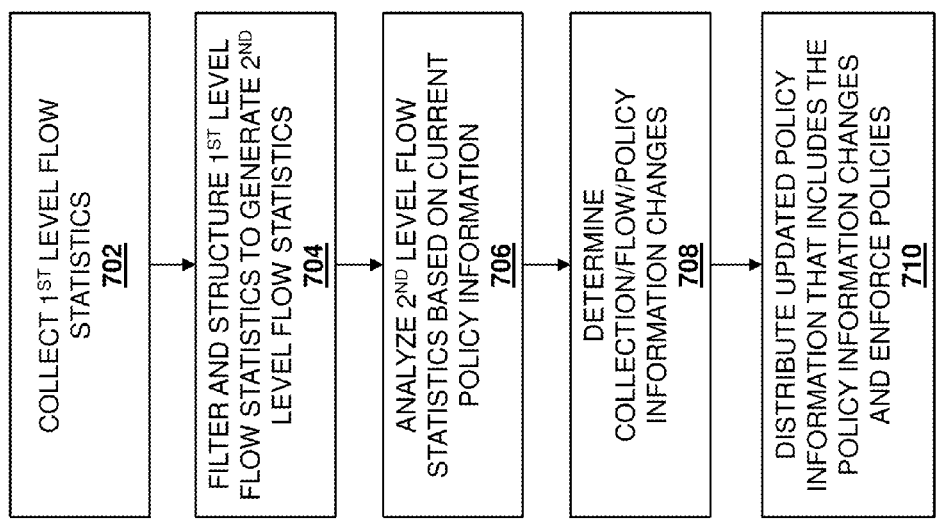

NETWORK FLOW MANAGEMENT SYSTEM

BACKGROUND

The present disclosure relates generally to information handling systems, and more particularly to a system for managing flows in an information handling system network.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling system such as, for example, switch devices, routers, access points, and/or other networking devices known in the art, are often coupled together in a network to allow information to be communicated between information handling systems. In many situations, Software Defined Networking (SDN) techniques may be implemented in such networks. SDN is an approach to networking that allows network administrators to manage network services through abstraction of high level functionality by decoupling the control plane systems that make decisions about where network traffic is sent from the underlying data plane systems that forward traffic to the selected destination. However, conventional SDN techniques utilize individual switch-based and port-based data collection, which provides the ability to perform switch-level management and switch-level flow analysis, but which realizes limited benefits to managing flows across the network. As such, operational environment conditions, bandwidth requirement conditions, positional-based configuration conditions, transient and sustained resource/collector conditions, transient and sustained flow microburst conditions, other data flow conditions, topology conditions, deployment conditions, and time/event driven profile conditions are not easily detected and addressed quickly.

Accordingly, it would be desirable to provide an improved network flow management system.

SUMMARY

According to one embodiment, an information handling system (IHS) includes a communication system that is configured to couple to a plurality of controllers that are each coupled to at least one switch device; a processing system that is coupled to the communication system; and a memory system that is coupled to the processing system and that includes instruction that, when executed by the processing system, cause the processing system to perform operations including: collecting first-level flow information for the plurality of switch devices from the plurality of controllers; filtering and structuring the first-level flow information to generate second-level flow information; analyzing the second-level flow information based on at least one current flow operation policy that is configured to cause the plurality of switch devices to perform first flow operations and, in response, determining at least one flow operation policy change; and distributing at least one updated flow operation policy that includes the at least one flow operation policy change to each of the plurality of controllers, wherein the at least one updated flow operation policy is configured to cause the plurality of switch devices to perform second flow operation that are different than the first flow operations.

BRIEF DESCRIPTION OF THE DRAWINGS

FIG. 7 is a flow chart illustrating an embodiment of a method for managing network flows.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
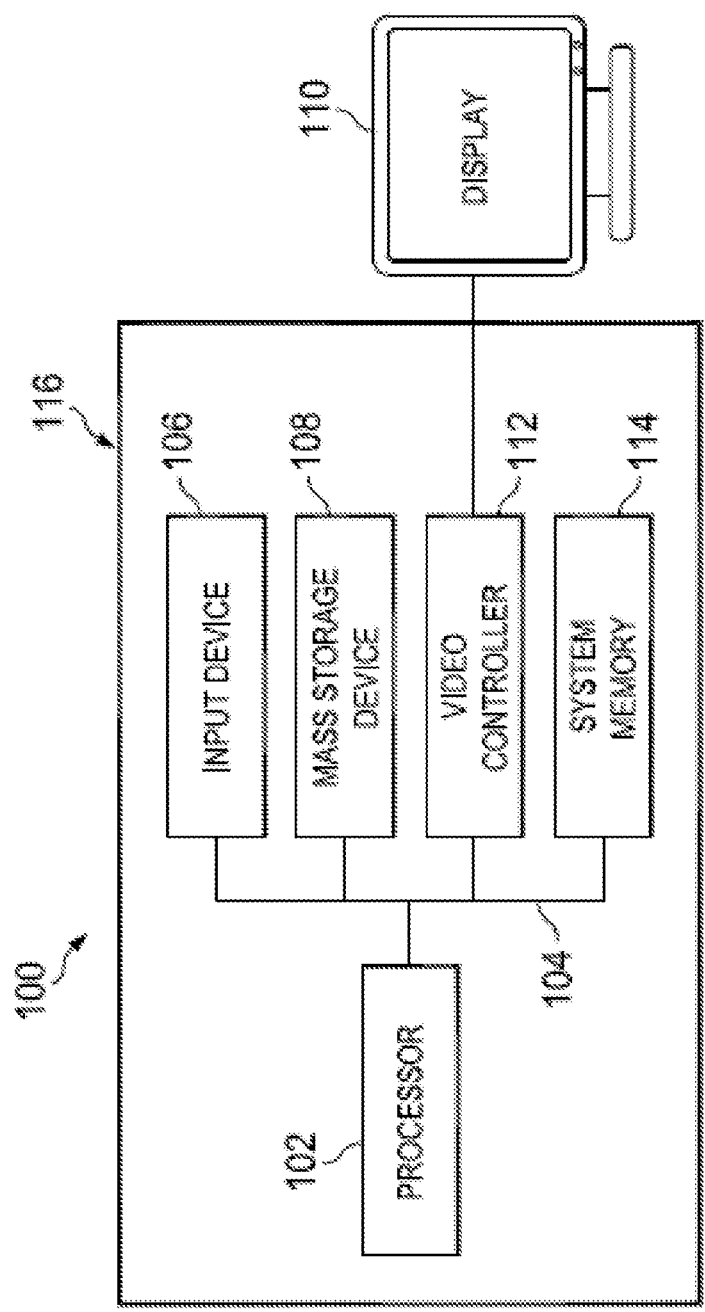
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
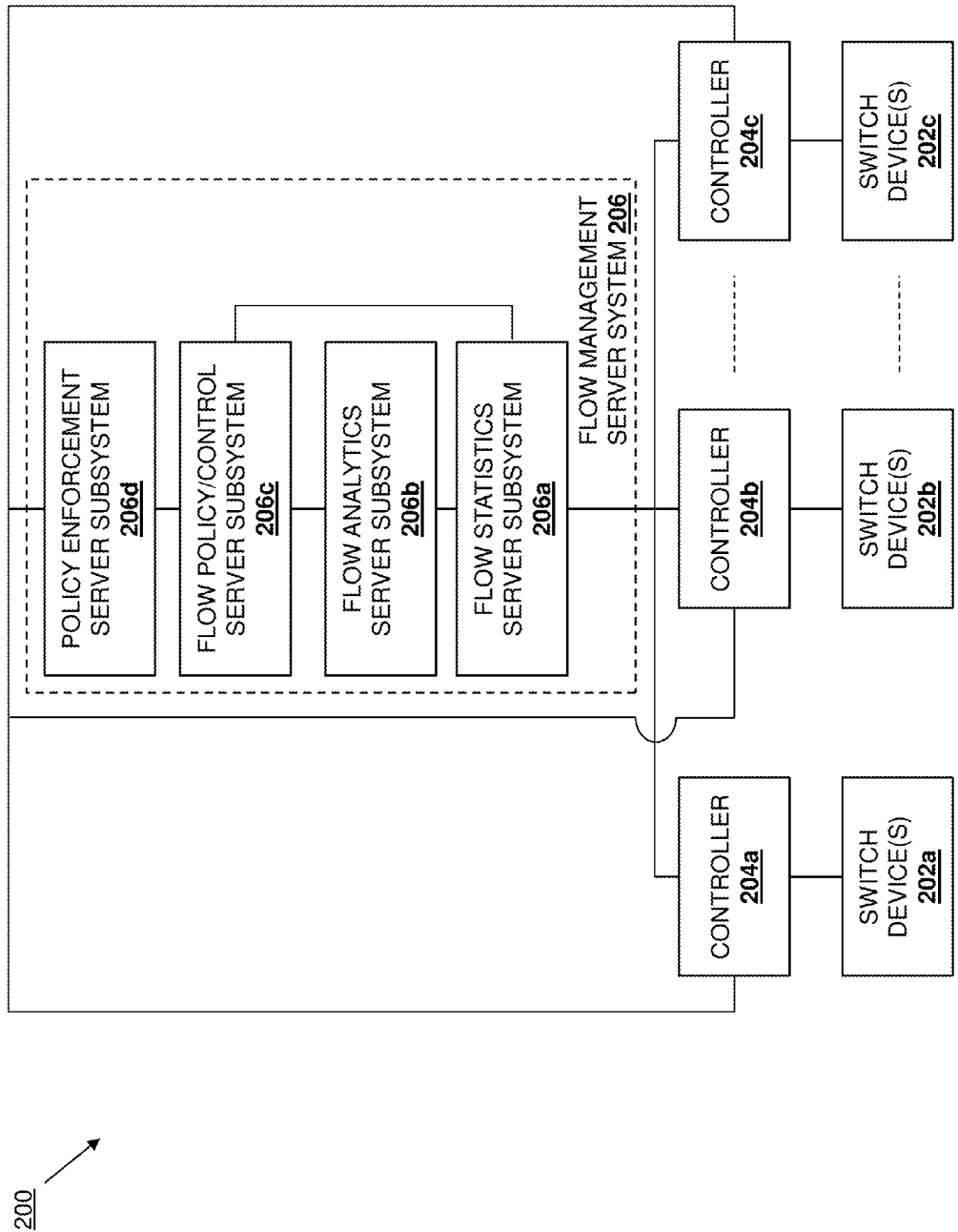
FIG. 2 is a schematic view illustrating an embodiment of a network flow management system.

Referring now to FIG. 2, an embodiment of a network flow management system 200 is illustrated. In the illustrated embodiment, the network flow management system 200 includes a plurality of switch devices including a subset of switch device(s) 202a, a subset of switch device(s) 202b, and up to a subset of switch device(s) 202c. Each of the switch devices 202a-c may be the IHS 100 discussed above and/or may include some or all of the components of the IHS 100. In the specific embodiments discussed below, the switch devices 202a-c are Software Defined Networking (SDN) switch devices that may operate according to the OPENFLOW® communication protocol (or other SDN communication protocols), and thus may include agents and/or other SDN components while remaining within the scope of the present disclosure. While illustrated and described as switches, the switch devices 202a-c may be provided by a variety of networking devices (e.g., routers, access points, etc.) while remaining within the scope of the present disclosure. In a specific example, one or more of the switch devices may be provided according to the teachings of U.S. Pat. No. 8,837,288, filed on Jul. 6, 2012; U.S. Pat. No. 9,077,658, filed on Sep. 15, 2014; and U.S. Patent Publication No. 2015/0319085, filed on Jun. 24, 2015; the disclosures of which are incorporated by reference in their entirety.

In the illustrated embodiment, a respective controller 204a, 204b, and up to 204c is coupled to each of the subset of switch device(s) 202a, the subset of switch device(s) 202b, and up to the subset of switch device(s) 202c. Each of the controllers 204a-c may be the IHS 100 discussed above and/or may include some or all of the components of the IHS 100. In the specific embodiments discussed below, the controllers 204a-c are SDN controllers that may operate according to the OPENFLOW® communication protocol (or other SDN protocols), and thus may include managers and/or other SDN components while remaining within the scope of the present disclosure.

In the illustrated embodiment, each of the controllers 204a-c are coupled to a flow management server system 206 that, as discussed below, includes a plurality of server subsystems that are configured to perform the functions of the flow management server system 206. However, in other embodiments, the flow management server system 206 may be provided by a single server, computing devices other than servers, and/or in a variety of manners that one of skill in the art in possession of the present disclosure will recognize will fall within the scope of the present disclosure. In the illustrated example, the flow management server system 206 includes a flow statistics server subsystem 206a that may be provided by the IHS 100 discussed above and/or may include some or all of the components of the IHS 100. In a specific example, the flow statistic server subsystem 206a includes one or more servers that are coupled to each of the controllers 204a-c via a communications coupling such as, for example, a Representational State Transfer (REST) interface that utilizes a stateless, client-server, cacheable communications protocol (e.g., Hypertext Transfer Protocol (HTTP)). However, other communications couplings between the flow statistics server subsystem 206a and the controllers 204a-c are envisioned as falling within the scope of the present disclosure.

In the illustrated example, the flow management server subsystem 206 also includes a flow analytics server subsystem 206b that may be provided by the IHS 100 discussed above and/or may include some or all of the components of the IHS 100. In a specific example, the flow analytics server subsystem 206b includes one or more servers that are coupled to the flow statistics server subsystem 206a. In the illustrated example, the flow management server subsystem 206 also includes a flow policy/control server subsystem 206c that may be provided by the IHS 100 discussed above and/or may include some or all of the components of the IHS 100. In a specific example, the flow policy/control server subsystem 206c includes one or more servers that are coupled to the flow analytics server subsystem 206b and the flow statistics server subsystem 206a. In the illustrated example, the flow management server subsystem 206 also includes a policy enforcement server subsystem 206d that may be provided by the IHS 100 discussed above and/or may include some or all of the components of the IHS 100. In a specific example, the policy enforcement server subsystem 206d includes one or more servers that are coupled to the flow policy/control server subsystem 206c and to each of the controllers 204a-c. While a specific example of the network flow management system 200 has been described, one of skill in the art in possession of the present disclosure will recognize that a wide variety of different computing devices and computing device configurations may be used to provide the network flow management system 200, and those devices and device configurations will fall within the scope of the present disclosure as well.

Figure 3:
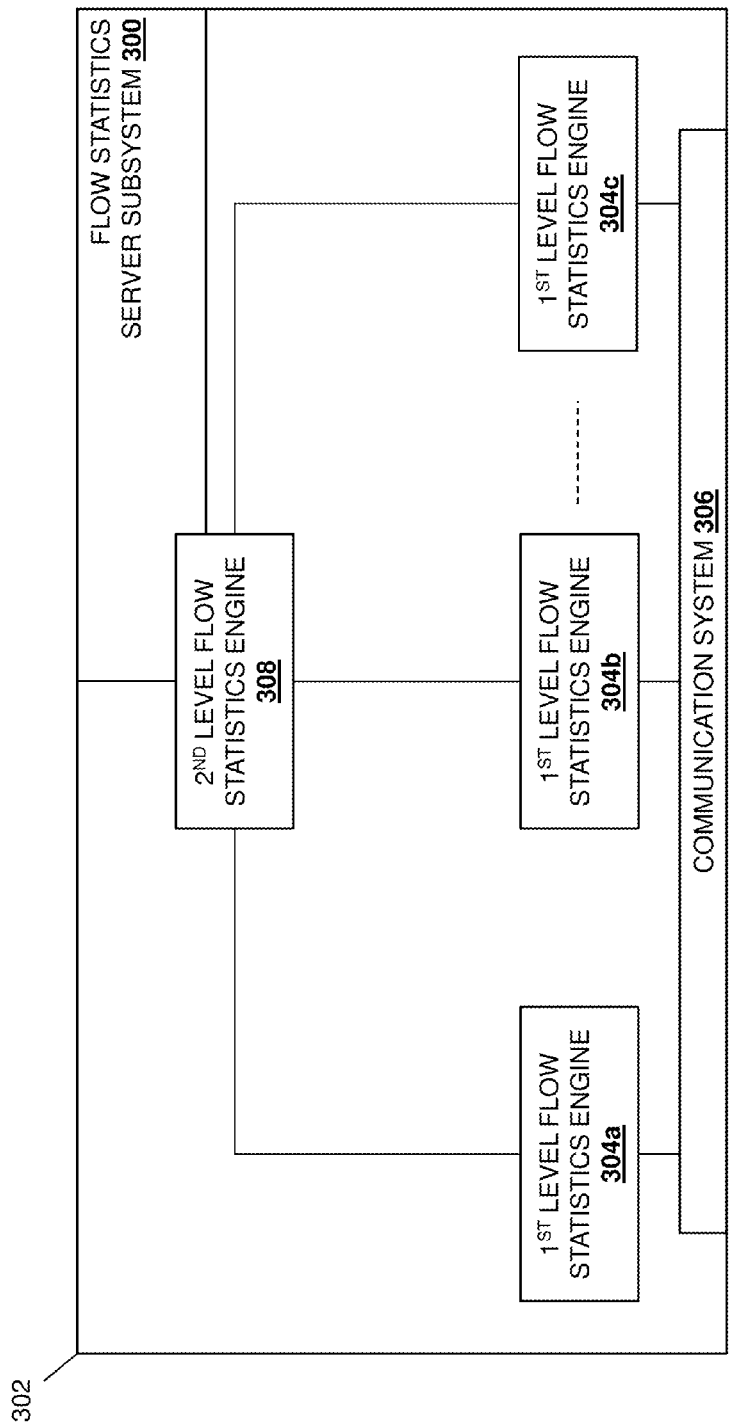
FIG. 3 is a schematic view illustrating an embodiment of a flow statistics server subsystem in the network flow management system of FIG. 2.

Referring now to FIG. 3, an embodiment of a flow statistics server subsystem 300, which may be the flow statistics server subsystem 206a of FIG. 2, is illustrated. As such, the flow statistics server subsystem 300 may be the IHS 100 discussed above with reference to FIG. 1 and/or may include some or all of the components of the IHS 100. In the illustrated embodiment, the flow statistics server subsystem 300 includes a chassis 302 that houses the components of the flow statistics server subsystem 300, only some of which are illustrated in FIG. 3. While the components of the flow statistics server subsystem 300 are illustrated as located in a single chassis, in other embodiments, the components of the flow statistics server subsystem 300 may be distributed across multiple chassis (e.g., multiple servers) while remaining within the scope of the present disclosure. In the illustrated embodiment, the chassis 302 houses a processing system (not illustrated, but which may include one or more of the processors 102 discussed above with reference to FIG. 1) and a memory system (not illustrated, but which may include the memory system 114 discussed above with reference to FIG. 1) that includes instructions that, when executed by the processing system, cause the processing system to provide one or more first-level flow statistics engines and second-level flow statistics engines that are configured to perform the functions of the first level flow statistics engines, second level flow statistics engines, and flow statistics servers subsystems discussed below.

In the illustrated embodiment, the chassis 302 houses a plurality of first-level flow statistics engines 304a, 304b, and up to 304c, that are each coupled to a communication system 306 (e.g., via a coupling between the processing system and the communication system 306). For example, the communications system 306 may include network interface controllers (NICs), wireless communications devices, and/or other communications subsystems that may be coupled through the communications coupling (e.g., the REST interface) to the controllers 204a-c. Using the specific example provided in FIG. 2, the first-level flow statistics engine 304a may be coupled through the communications system 306 and the REST interface to the controller 204a, the first-level flow statistics engine 304b may be coupled through the communications system 306 and the REST interface to the controller 204b, and the first-level flow statistics engine 304c may be coupled through the communications system 306 and the REST interface to the controller 204c. In the illustrated embodiment, the chassis 302 also houses a second-level flow statistics engine 308 that is coupled to each of the first-level flow statistics engines 304a-c, as well as to the flow analytics server subsystem 206b and the flow policy/control server subsystem 206c, discussed above. While a specific example of the flow statistics server subsystem 300 has been described, one of skill in the art in possession of the present disclosure will recognize that a wide variety of different components and component configurations may be used to provide the flow statistics server subsystem 300, and those components and component configurations will fall within the scope of the present disclosure as well.

Figure 4:
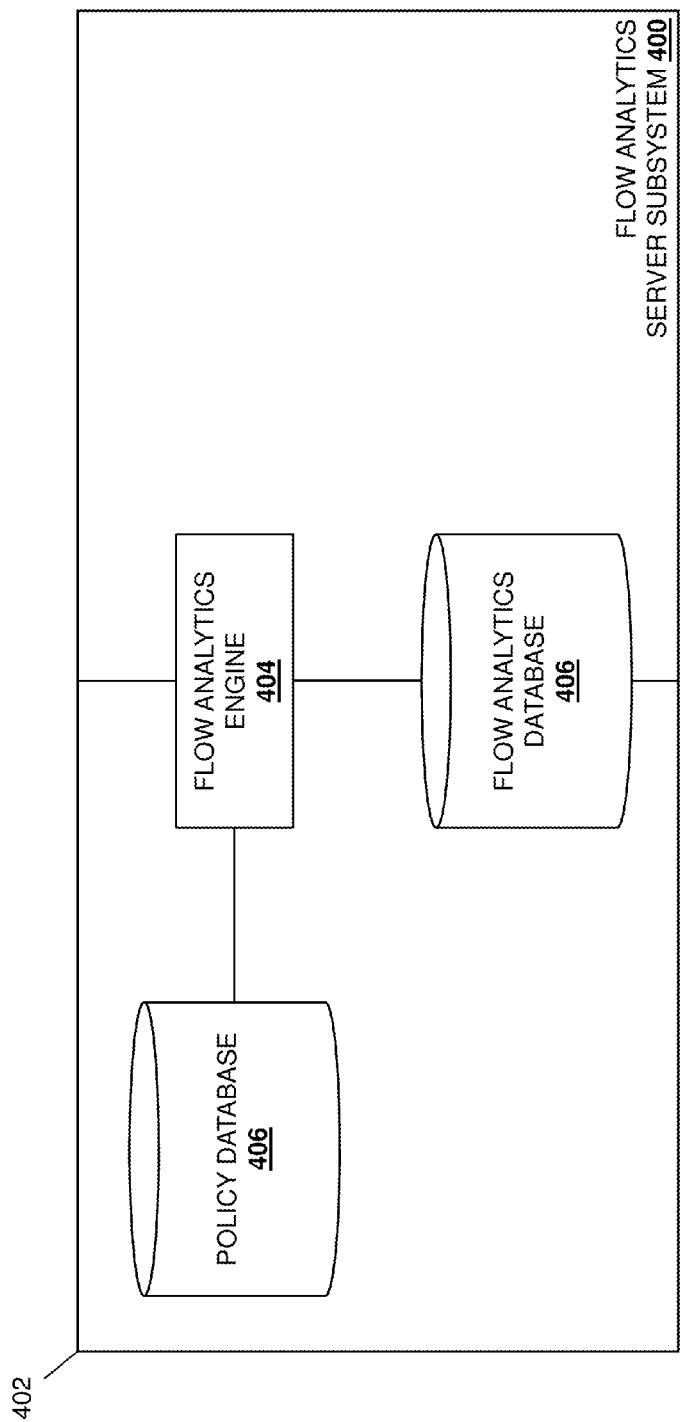
FIG. 4 is a schematic view illustrating an embodiment of a flow analytics server subsystem in the network flow management system of FIG. 2.

Referring now to FIG. 4, an embodiment of a flow analytics server subsystem 400, which may be the flow analytics server subsystem 206b of FIG. 2, is illustrated. As such, the flow analytics server subsystem 400 may be the IHS 100 discussed above with reference to FIG. 1 and/or may include some or all of the components of the IHS 100. In the illustrated embodiment, the flow analytics server subsystem 400 includes a chassis 402 that houses the components of the flow analytics server subsystem 400, only some of which are illustrated in FIG. 4. While the components of the flow analytics server subsystem 400 are illustrated as located in a single chassis, in other embodiments, the components of the flow analytics server subsystem 400 may be distributed across multiple chassis (e.g., multiple servers) while remaining within the scope of the present disclosure. In the illustrated embodiment, the chassis 402 houses a processing system (not illustrated, but which may include one or more of the processors 102 discussed above with reference to FIG. 1) and a memory system (not illustrated, but which may include the memory system 114 discussed above with reference to FIG. 1) that includes instructions that, when executed by the processing system, cause the processing system to provide one or more flow analytics engines that are configured to perform the functions of the flow analytics engines and flow analytics server subsystems discussed below.

In the illustrated embodiment, the chassis 402 houses a flow analytics engine 404 that may be coupled to a storage system. For example, chassis 402 may house a storage system (not illustrated, but which may include one or more of the storage devices 108 discussed above with reference to FIG. 1) that includes a flow analytics database 406 and a policy database 408. Using the specific example provided in FIG. 2, the flow analytics database 406 may be coupled to the second-level flow statistics engine 308 in the flow statistics server subsystem 300 (e.g., via a coupling between the storage system in the flow analytics server subsystem 400 and the processing system in the flow statistics server subsystem 300) such that it is configured to receive and store second-level flow statistics, discussed in further detail below. In addition, the policy database 406 may be coupled to the flow analytics engine 404 (e.g., via a coupling between the storage system and the processing system) and configured to receive and store flow policies such as the flow operation policies discussed in further detail below. Furthermore, the flow analytics engine 404 may be coupled to the flow policy/control server subsystem 206c, discussed in further detail below. While a specific example of the flow analytics server subsystem 400 has been described, one of skill in the art in possession of the present disclosure will recognize that a wide variety of different components and component configurations may be used to provide the flow analytics server subsystem 400, and those components and component configurations will fall within the scope of the present disclosure as well.

Figure 5:
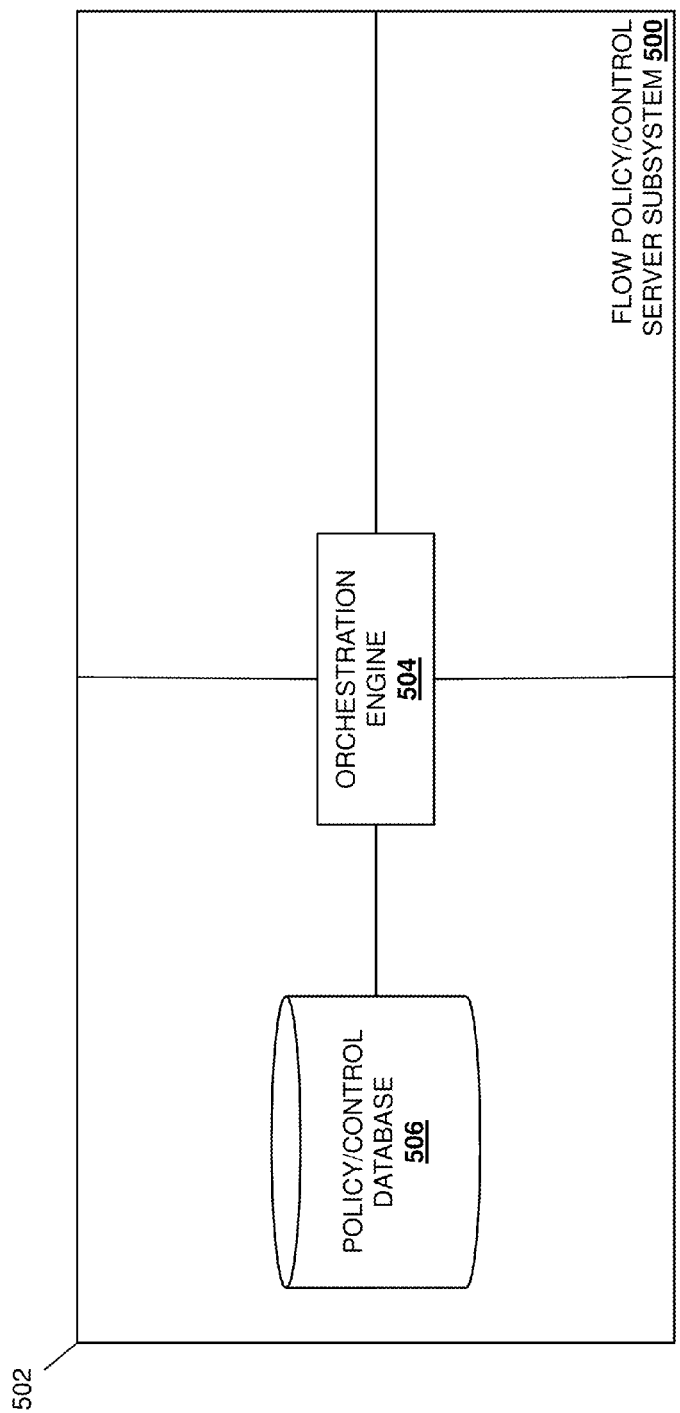
FIG. 5 is a schematic view illustrating an embodiment of a flow policy/control server subsystem in the network flow management system of FIG. 2.

Referring now to FIG. 5, an embodiment of a flow policy/control server subsystem 500, which may be the flow policy/control server subsystem 206c of FIG. 2, is illustrated. As such, the flow policy/control server subsystem 500 may be the IHS 100 discussed above with reference to FIG. 1 and/or may include some or all of the components of the IHS 100. In the illustrated embodiment, the flow policy/control server subsystem 500 includes a chassis 502 that houses the components of the flow policy/control server subsystem 500, only some of which are illustrated in FIG. 5. While the components of the flow policy/control server subsystem 500 are illustrated as located in a single chassis, in other embodiments, the components of the flow policy/control server subsystem 500 may be distributed across multiple chassis (e.g., multiple servers) while remaining within the scope of the present disclosure. In the illustrated embodiment, the chassis 502 houses a processing system (not illustrated, but which may include one or more of the processors 102 discussed above with reference to FIG. 1) and a memory system (not illustrated, but which may include the memory system 114 discussed above with reference to FIG. 1) that includes instructions that, when executed by the processing system, cause the processing system to provide one or more orchestration engines that are configured to perform the functions of the orchestration engines and flow policy/control server subsystems discussed below.

In the illustrated embodiment, the chassis 502 houses an orchestration engine 504 that may be coupled to a storage system. For example, chassis 502 may house a storage system (not illustrated, but which may include one or more of the storage devices 108 discussed above with reference to FIG. 1) that includes a policy/control database 506. Using the specific example provided in FIG. 2, the orchestration engine 504 may be coupled to the flow analytics engine 404 in the flow analytics server subsystem 400 (e.g., via a coupling between the processing system in the flow policy/control server subsystem 500 and the processing system in the flow analytics server subsystem 400), the policy/control database 506 (e.g., via a coupling between the processing system and the storage system), the second-level flow statistics engine 308 in the flow statistics server subsystem 300 (e.g., via a coupling between the processing system in the flow policy/control server subsystem 500 and the processing system in the flow statistics server subsystem 300), and the policy enforcement server subsystem 206d, discussed in further detail below. While a specific example of the flow policy/control server subsystem 500 has been described, one of skill in the art in possession of the present disclosure will recognize that a wide variety of different components and component configurations may be used to provide the flow policy/control server subsystem 500, and those components and component configurations will fall within the scope of the present disclosure as well.

Figure 6:
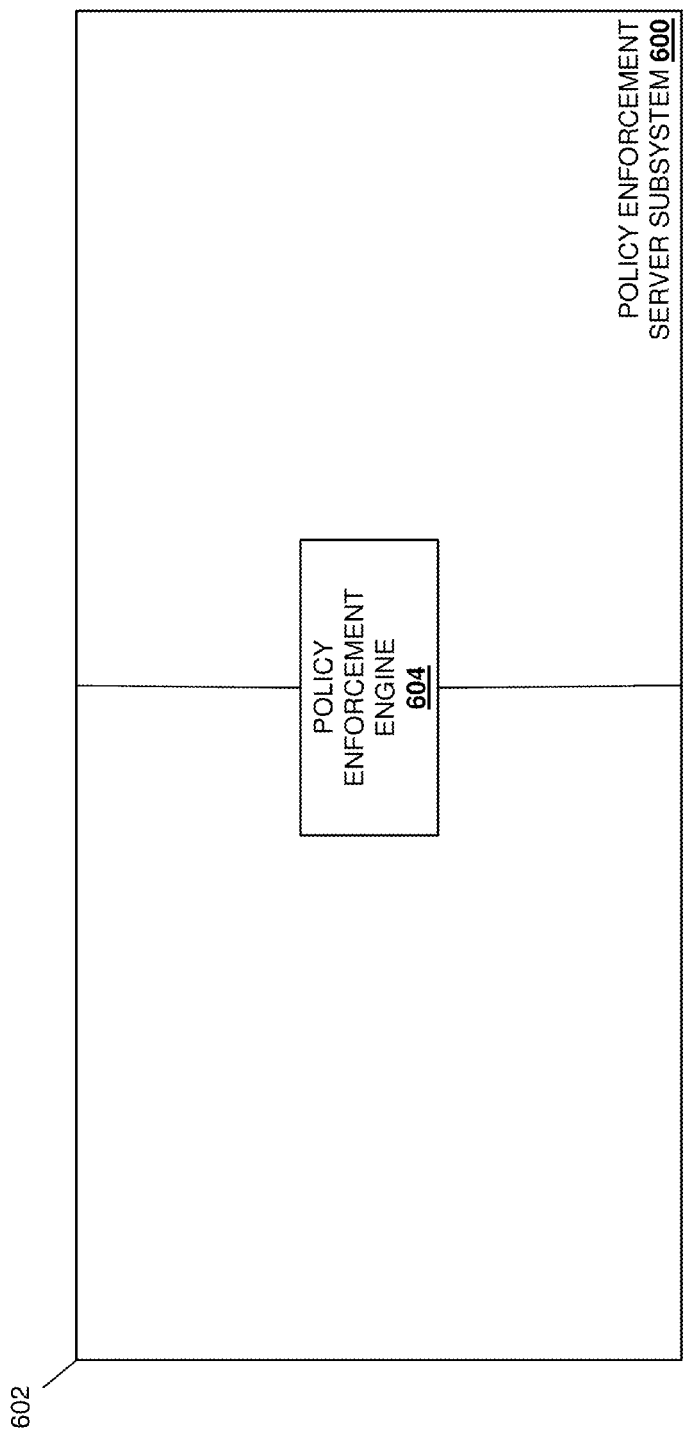
FIG. 6 is a schematic view illustrating an embodiment of a policy enforcement server subsystem in the network flow management system of FIG. 2.

Referring now to FIG. 6, an embodiment of a policy enforcement server subsystem 600, which may be the policy enforcement server subsystem 206d of FIG. 2, is illustrated. As such, the policy enforcement server subsystem 600 may be the IHS 100 discussed above with reference to FIG. 1 and/or may include some or all of the components of the IHS 100. In the illustrated embodiment, the policy enforcement server subsystem 600 includes a chassis 602 that houses the components of the policy enforcement server subsystem 600, only some of which are illustrated in FIG. 6. While the components of the policy enforcement server subsystem 600 are illustrated as located in a single chassis, in other embodiments, the components of the policy enforcement server subsystem 600 may be distributed across multiple chassis (e.g., multiple servers) while remaining within the scope of the present disclosure. In the illustrated embodiment, the chassis 602 houses a processing system (not illustrated, but which may include one or more of the processors 102 discussed above with reference to FIG. 1) and a memory system (not illustrated, but which may include the memory system 114 discussed above with reference to FIG. 1) that includes instructions that, when executed by the processing system, cause the processing system to provide one or more policy enforcement engines that is configured to perform the functions of the policy enforcement engines and flow policy/control server subsystems discussed below.

Using the specific example provided in FIG. 2, the policy/enforcement engine 604 may be coupled to the orchestration engine 504 in the flow policy/control server subsystem 500 (e.g., via a coupling between the processing system in the policy enforcement server subsystem 600 and the processing system in the flow policy/control server subsystem 500), and to each of the controllers 204a-c. While a specific example of the policy/enforcement server subsystem 600 has been described, one of skill in the art in possession of the present disclosure will recognize that a wide variety of different components and component configurations may be used to provide the policy/enforcement server subsystem 600, and those components and component configurations will fall within the scope of the present disclosure as well.

Referring now to FIG. 7, an embodiment of a method 700 for managing network flows is illustrated. As discussed below, the systems and methods of the present disclosure provide scalable data collection that enables intelligent and dynamic derivation of second-level flow statistics through the examination of first-level flow statistics that describe flows and flow patterns, which provides for the automatic determination of how to perform, adjust, and focus flow statistic collection efforts. Furthermore, second-level flow statistics that are generated may then be analyzed based on a variety of flow policies to produce recommended flow and policy changes. Those recommended flow and policy changes may then be applied to cause flow operations that produce desired network flow results. Such functionality allows for the collection, storage, and analysis of flow history data, which provides for the intelligent learning of network flow environments and allows for the adaptation of policies and the redirection of flows to maintain policy rules that may be associated with service level agreements (e.g., a service level agreement that guarantees a network user a minimum amount of bandwidth in a network during certain time periods). For example, a first service level agreement may be provided for high-bandwidth, low latency network users (e.g., high frequency traders) during particular hours of the day (e.g., a time period when a market is open), while a second service level agreement may be provided for high read-time network users (e.g., video subscription service users). The method 700 allows for the collection of first-level flow statistics and the derivation of second-level flow statistics that indicate reoccurring events (e.g., the high-bandwidth, low latency network users providing the majority of the network flows/load during the morning and early afternoon on weekdays; the high-read time network users providing the majority of the network flows/load in the evenings) in order to allow the system to load balance and redirect flows to network resources in order to satisfy those service level agreements. These any many other benefits will be apparent to one of skill in the art in possession of the present disclosure.

Figure 8A:
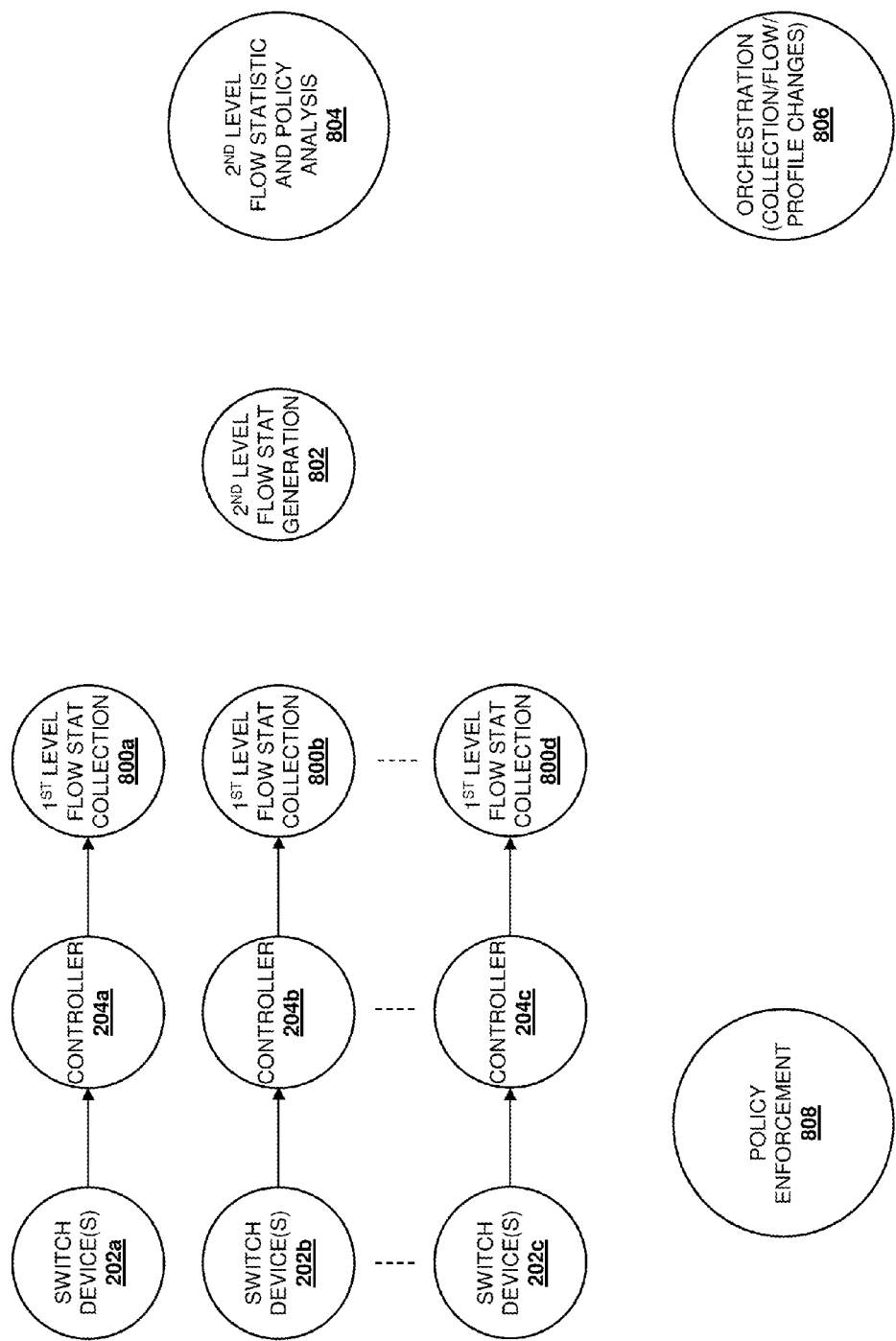
FIG. 8A is a schematic view illustrating first-level flow statistics collection by the flow management system of FIG. 2.

With reference to FIG. 8A, the method 700 begins at block 702 where first level flow statistics are collected. In an embodiment, at block 702, each of the controllers 204a, 204b, and up to 204c performs first-level flow statistic collection operations 800a, 800b, and up to 800c, respectively, to retrieve first-level flow statistics from its respective subset of switch device(s) 202a, 202b, and up to 202c. The first-level flow statistics collected at block 702 may include raw flow statistics reported by the subsets of switch devices 202a-c such as, for example, a number of transmitted bytes, a number of transmitted frames, flow rates for particular interfaces and/or networks, flow durations, and/or a variety of other first-level flow information known in the art. One of skill in the art in possession of the present disclosure will recognize that each of the switch devices 202a-c may be SDN switch devices that are configured to operate according to one or more flow policies (referred to below as "current flow policies" to distinguish those flow policies from "updated flow policies" that are determined by the flow management server system 206 as discussed below) that cause the switch devices 202a-c to perform flow operations (e.g., the routing and/or directing of flows) to provide flows through the network. As the flow operations are performed by the switch devices 202*a-c*, raw flow statistics are generated in the switch devices that describe that switch devices actions in providing the flows through their respective portion of the network, and those raw flow statistics are reported to the controllers 204*a-c* as the "first-level" flow statistics. As discussed below, the level of detail in the raw/first-level flow statistics may vary depending on the capabilities of the switch device handling the flows and reporting the raw/first-level flow statistics, and thus varying levels of raw/first-level flow statistics detail may be compensated for in the flow management server system 206 using techniques such as weighing as discussed below.

In an embodiment, the first level flow statistics may be collected using at least one flow statistic collection policy (referred to below as "current flow statistic collection policies" to distinguish those flow statistic collection policies from "updated flow statistic collection policies" that are determined by the flow management server system 206 as discussed below). In some embodiments, the controllers 204*a-c* may analyze the first-level flow statistics collected at block 702 to determine a variety of information about flows being handed by the switch devices 202*a-c* including, for example, whether previous instructions to create flow(s) were carried out to actually create those flow(s), a number of times a specific flow with specific characteristics has occurred, variance between flow durations, and/or determine a variety of switch device information known in the art. In a specific example, a type of flow that is associated with a specific input port, a specific output port, and a specific virtual local area network (VLAN) may occur multiple times, while the duration of each occurrence of that flow type may vary. In such an example, the count of the number of times a flow of that type matched the criteria that defines that flow type, along with the duration of each of those flows, the average duration of those flows, the number of packets belonging to those flows, and/or other information associated with those flows may be derived as first level flow statistics from the raw flow statistics.

Figure 8B:
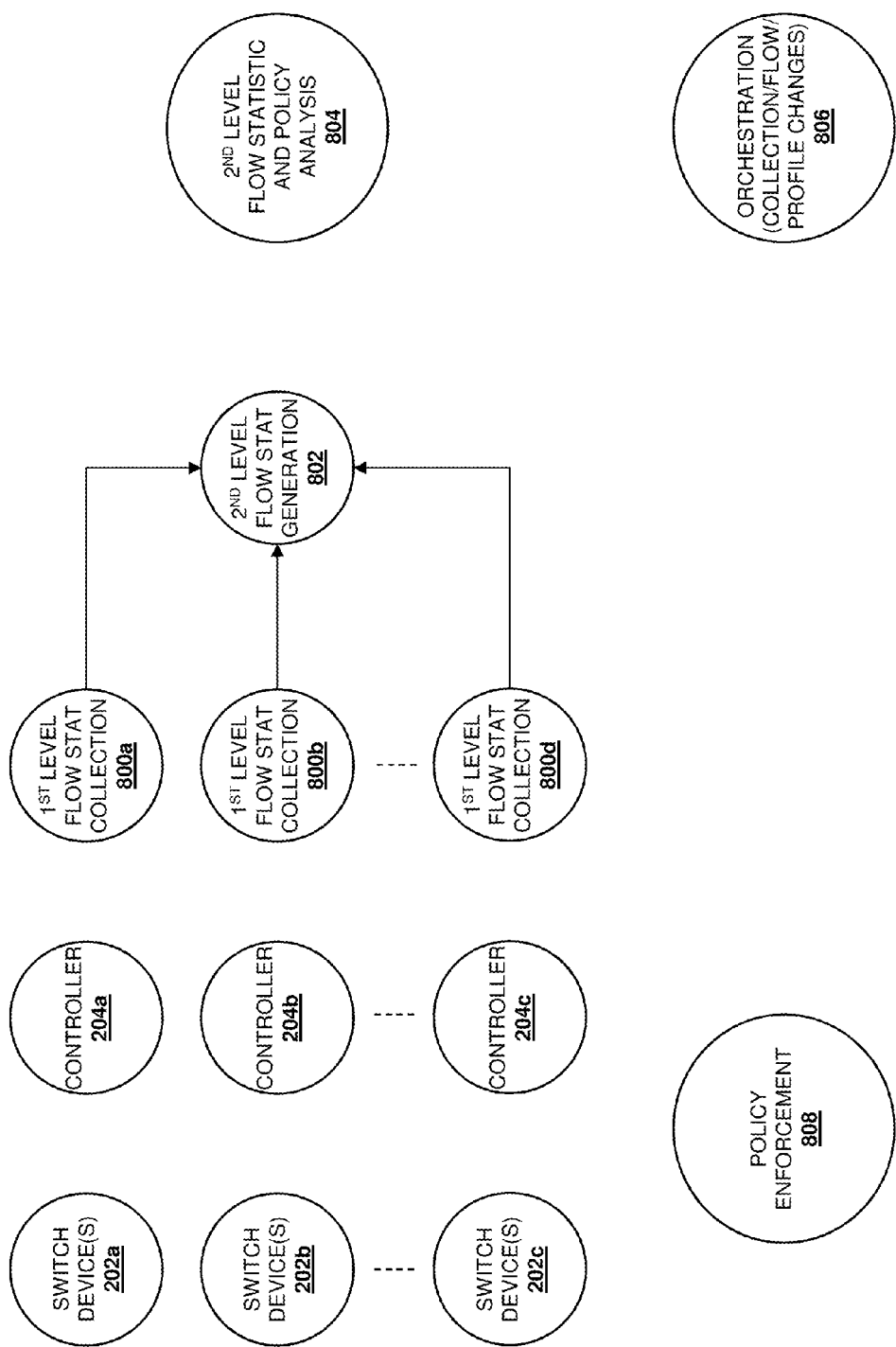
FIG. 8B is a schematic view illustrating second-level flow statistics generation by the flow management system of FIG. 2.

With reference to FIG. 8B, the method 700 then proceeds to block 704 where first-level flow statistics are used to generate second-level flow statistics. At block 704, the controllers 204*a*, 204*b*, and up to 204*c* provide the first-level flow statistics collected at block 702 to the flow statistics server subsystem 206*a* for second level flow statistic generation operations 802. In an embodiment, at block 704, the first-level flow statistics engines 304*a*, 304*b*, and up to 304*c* may receive the first-level flow statistics from the controllers 204*a*, 204*b*, and up to 204*c*, respectively, and perform filtering operations on the first-level flow statistics. In some embodiments, the filtering of first-level flow statistics may be performed by the first-level flow statistics engines 304*a-c* using at least one flow statistic filtering policy (referred to below as "current flow statistic filtering policies" to distinguish those flow statistic filtering policies from "updated flow statistic filtering policies" that are determined by the flow management server system 206 as discussed below). Examples of flow statistic filtering policies include policies to not collect flow statistics for any flow where the match criteria includes a particular VLAN, policies to collect flow statistics for any flow originating from a particular source Media Access Control (MAC) address, policies to collect flow statistics for flows having a flow duration of greater than a particular amount of time (e.g., 90 seconds), and/or other flow statistic filtering policies that would be apparent to one of skill in the art in possession of the present disclose.

As such, the first-level flow statistics engines 304*a-c* may provide a first level of intelligence that utilizes the flow statistic filtering policies to filter the first-level flow statistics to provide filtered first-level flow statistics that include, for example, views of flows across a plurality of the switch devices 202*a-c* (e.g., "end-to-end" views of flows through the network), a number of flows originating from a particular source Internet Protocol (IP) address, a number of flows where the match criteria includes a particular VLAN, an average durations of flows with match criteria that includes a particular VLAN, and/or other filtered first-level flow statistics that would be apparent to one of skill in the art in possession of the present disclosure.

In an embodiment, at block 704, the first-level flow statistics engines 304*a-c* may then provide the filtered first-level flow statistics to the second-level flow statistics engine 308 to perform structuring operations on the filtered first-level flow statistics in order to generate second-level flow statistics. In some embodiments, the structuring of filtered first-level flow statistics may be performed by the second-level flow statistics engine 308 using at least one flow statistic structuring policy (referred to below as "current flow statistic structuring policies" to distinguish those flow statistic structuring policies from "updated flow statistic structuring policies" that are determined by the flow management server system 206 as discussed below). For example, the second-level flow statistics engine 308 may use flow statistic structuring policies to perform heuristics on the filtered first-level flow statistics to structure the filtered first-level flow statistics (e.g., by identifying flows that have lasted for longer than some period of time). In an embodiment, the second-level flow statistics engine 308 may further structure the filtered first-level flow statistics using flow statistic structuring policies to identify, for example, flows that have violated one or more flow policies (discussed in further detail below), flows that were blocked or dropped according to flow policies, and/or flows according to other flow policy or raw data characteristics. For example, filtered first-level flow statistics may be structured to allow for the identification of flows that have violated at least one flow operation policy that is implemented on switch device(s) 202*a-c* and that causes the switch device(s) 202*a-c* to provide a flow in the network. As such, flow statistics may be categorized based on any number of rules that are provided to the flow management server system 206 including, for example, rules for grouping flow statistics for denied log-ins, rules for grouping flow statistics indicative of an attempted breach of network security, etc.), a number of occurrences of a group of flows using a particular VLAN and having a duration of at least a particular time period (e.g., 90 seconds), a maximum and average duration of flows on a particular VLAN that had a duration of at least a particular time period (e.g., 90 seconds), and/or other rules that would be apparent to one of skill in the art in possession of the present disclosure. The structuring the filtered first-level flow statistics generates second-level flow statistics that may be displayed to an administrator user via a management interface (e.g., a management device with a display screen for displaying a management graphical user interface that is configured display the second-level flow statistics).

The teachings of the present application provide for several advantages in the collection and generation of flow statistics. In many embodiments, information learned about flow patterns and flow statistics (discussed below) allow for the collection and generation of flow statistics to be focused on the collection of data that is most relevant to the network, without the need for user modification or interaction in the details of which flow statistics to collect. For example, types of flow patterns of interest (e.g., unbalanced flows across inter-switch links, flows with periods of sustained bandwidth above a threshold limit, flows that have a higher-than-desired latency, etc.) may be defined in flow collection, filtering, and/or structuring policies using searchable flow parameters, which allows the flow management server system 206 to collect and generate data on those flow patterns of interest without any further user interaction. As such, scalability is provided at least in part based on the reduced and distributed flow processing effort that focuses possibly limited flow gathering and analysis resources on particular areas of the network, and that data can be used for later flow analysis and control.

In many embodiments, the configuration of flow statistics collection may be performed via pre-defined collection profiles, as well as by users identifying various flow statistics criteria such as, for example, flow direction, flow duration, bandwidth used (e.g., as a raw amount or a percentage of available bandwidth, latency, "burstiness", etc.), and/or a variety of other flow criteria known in the art. Such configuration may also include a tunable resolution that allows the granularity of flow statistics collection to be varied for different flow profiles, which also enhances the ability to scale the system. In addition, flow statistics data may be pre-processed and compressed before it is stored in order to allow for more data to be collected while also enabling quick provisioning of that data for orchestration (discussed below).

In many embodiments, the management of intelligent flow statistics collection is also improved using intelligence built into the flow statistics collection that may be tuned to gather flow statistics data only to the level that devices/collectors (e.g., the switch devices 202*a-c* and/or the controllers 204*a-c*) can handle, thus lowering the load on the flow processing system and providing for automatic detection and integration of device resource and flow statistics collector limitations into the flow processing algorithms. For example, if a particular switch device can only handle a limited data collection load, that switch device may be identified as generating flow statistics that are of lower value than a switch device that includes higher capability flow statistic collection, and the flow statistics retrieved from that switch device may be weighted lower than flow statistics received from the higher capability switch device. In many embodiments, data flow anomalies such as microbursts, flow statistics gaps, and/or other anomalies known in the art, may be detected and marked in the collected flow statistics data, which allows for flow statistics data to be weighted for later analysis so that anomalies like microbursts or inconsistent flow statistics data collection may be taken into account.

In many embodiments, the manual configuration of flow statistics collection parameters that are needed when a user creates configurations or changes flow profiles is eliminated by the flow management server system 206. For example, factors such as an increased number of devices or other resources, deployment changes in the tenancy of the network, bandwidth requirement changes, position-based configuration changes, transient events, and/or other flow-based operational environment changes may drive new flow profiles or flow policy modifications to existing flow profiles that may be determined and automatically implemented by the flow management server system 206.

In many embodiments, the flow management server system 206 provides for auditable flows and the management of flow profile changes. For example, all changes to existing or new flow profiles may be logged in a remote server to allow for yet another layer of analysis of historical flow data (e.g., flow profile history data). Furthermore, higher level analysis and feedback may be provided by the communication of flow statistics and flow profile changes from the flow policy/control server subsystem 206*c* and to each of the controllers 204*a-c* and switch devices 202*a-c*.

In many embodiments, "zero-touch" configuration is enabled by the network flow management system 200. For example, if a flow profile is provided and no change is needed to a particular flow statistics collection policy, the default values for that flow statistics collection policy may be provided for flow statistics collection related to that flow profile. For example, such flow statistics collection policies may be stored and distributed according to global orchestration level profiles. Furthermore, flow statistics collection policies may be configured ranging from high-resolution sampling on few data points (e.g., lossless flow statistics collection), to low resolution sampling on more data points (e.g., "lossy" flow statistics collection). Further still, tiered data storage for collected flow statistics may be provided, and as the flow statistics age (in real-time or relative time), the lower priority flow statistics data may be aged out before the flow statistics data that fits a higher profile pattern.

Thus, the creation of flow statistics collection policies and profiles based on operating environment changes, user inputs, and/or other tunable parameters drives a pre-built flow statistics data gathering profile structure that allows for simpler, higher scalability management and automation of the flow statistics data collection process.

Figure 8C:
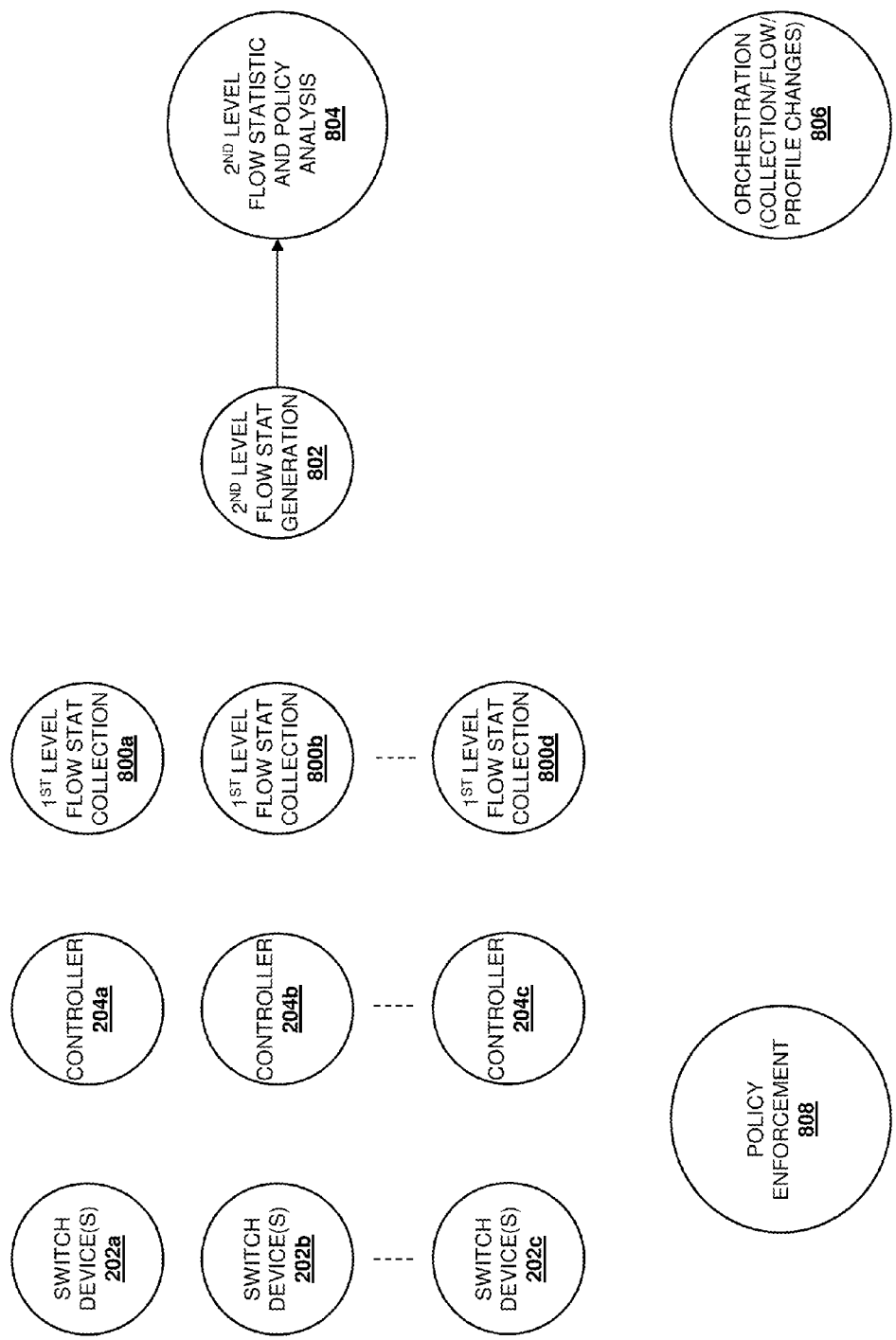
FIG. 8C is a schematic view illustrating second-level flow statistic and policy analysis by the flow management system of FIG. 2.

With reference to FIG. 8C, the method 700 then proceeds to block 706 where second-level flow statistics and flow policies are analyzed. In an embodiment, at block 706 the second-level flow statistics engine 308 provides the second-level flow statistics generated at block 704 to the flow analytics database 406 in the flow analytics server subsystem 400, and the flow analytics engine 404 performs second-level flow statistic and policy analysis operations 804. In an embodiment, the flow analytics engine 404 may analyze the second-level flow statistics generated at block 704 based on at least one current flow operation policy that is implemented by the switch device(s) 202*a-c* and that causes the switch device(s) 202*a-c* to perform particular flow operations, based on at least one current flow statistics collection policy that is implemented in the switch device(s) 202*a-c* and that causes the switch device(s) to collect first-level flow statistics. In an embodiment, the flow analytics engine 404 may analyze the second-level flow statistics generated at block 704 based on at least one current flow statistics filtering policy that is implemented in the first-level flow statistics engine(s) 304*a-c* and that causes the first-level flow statistics engine(s) 304*a-c* to filter first-level flow statistics. In an embodiment, the flow analytics engine 404 may analyze the second-level flow statistics generated at block 704 based on at least one current flow statistics structuring policy that is implemented in the second-level flow statistics engine 308 and that causes the second-level flow statistics engine 308 to structure filtered first-level flow statistics to generate second-level flow statistics. In an embodiment, the flow analytics engine 404 may analyze the second-level flow statistics generated at block 704 based on any other policies that may be implemented in the network flow management system 206 as well.

For example, the flow analytics engine 404 may analyze the second-level flow statistics in the flow analytics database 406 to detect patterns in flows (e.g., latency patterns, quality-of-service (QoS) patterns, back pressure patterns, bandwidth patterns, etc.), determine if flow policies stored in the policy database 406 are being violated, correlate flow patterns and flow policies (e.g., comparing goals of flow policies with actual flow conditions in the network) and/or analyze any other details that is identifiable from the second-level flow statistics. In an embodiment, the flow analytics engine 404 may use the second-level flow statistics to detect one or more flow patterns in a plurality of flows. For example, a plurality of flows may include a flow pattern that is identified by an occurrence of particular flow types that are defined in the filters discussed above over varying time periods (e.g., a number of occurrences of a flow having a duration of greater than 90 seconds that involved a particular VLAN during particular time periods (e.g., midnight to 6 am, 6 am to noon, noon to 6 pm, and 6 pm to midnight) along with the average duration of each grouping, input ports used, etc.), a number of flows that have an average duration that is greater during specific times of the day and that include match criteria with a particular input port on a particular switch, a number of times a particular flow with match criteria that includes a particular input port with a minimum duration during a particular time period (e.g., midnight to 6 am), and/or other flow patterns that would be apparent to one of skill in the art in possession of the present disclosure. In another embodiment, the flow analytics engine 404 may use the second-level flow statistics to detect a first flow provided along a first flow path by the switch device(s) 202a-c that has common flow characteristics with a second flow provided along a second flow path by the switch device(s) 202a-c. For example, a two or more flows may include common flow characteristics that are identified by attributes such as flow match criteria (e.g., VLAN identifier, input port identifier, etc.), raw flow statistics (e.g., number of frames, number of bytes, durations, etc.) and/or other flow characteristics that would be apparent to one of skill in the art in possession of the present disclosure. One of skill in the art in possession of the present disclosure will recognize that the matching of various information defined in the filtering for the first and second level flow statistics operates to determine whether the characteristics are relevant to a specific flow and policy, and are used to determine whether those characteristics should be used for analysis input or discarded. As such, as flows in the network dynamically change, those changes can be detected in real or near-real time.

In a specific example, the second-level flow statistics for the flows utilized primarily by high frequency trade users may be analyzed at block 706 by monitoring and analyzing short bursts of flow activity between a particular input port on a particular switch at short, random intervals that occur between a particular time period (e.g., 9 am and 5 pm), the second-level flow statistics for the flows utilized by video streaming users may be analyzed at block 706 by monitoring and analyzing average constant flow durations of particular durations (e.g., 90 to 150 minutes) with a particular Ethertype between a particular time period (e.g., 5pm and midnight), and the second first-level flow statistics for other flows may be analyzed at block 706 by monitoring and analyzing flow that occur every time there is a major earthquake in a particular geographic region (e.g., an island chain), or flows that occur in a particular time period (e.g., between 2 am and 3 am) that last for a particular duration (e.g., 30 minutes or less).

In some embodiments, the flow analytics engine 404 may begin with thresholds (e.g., bandwidth thresholds, QoS thresholds, etc.), and then analyze the second-level flow statistics in the flow analytics database 406 to determine if those thresholds are being violated. For example, a policy in the policy database 406 may designate that no link between switch devices in the network carry data traffic above 85% of a target bandwidth, and the flow analytics engine 404 may analyze the second-level flow statistics in the flow analytics database 406 to determine flows and links in the network, identify links that are over the designated threshold (e.g., 85% of the target bandwidth), and determine whether flows may be moved to remedy the violation of that policy. In another example, the flow analytics engine 404 may prioritize links and identify minimum and maximum bandwidth adjustments for those links, as well as flows that may be handled by different switch devices, in order to satisfy a policy. Furthermore, policies may be created and provided in the policy database 406 that include rules that provide for desired levels of application performance for certain events, certain times, etc. As such, the second-level flow statistics that describe all of the flows in the network allows each of those flows to be analyzed to determine flow patterns of those flows, and check those flow patterns against flow policies in order to determine flow policy violations, as well as identify whether flow policies may be disregarded for particular flow patterns that the network can handle.

In many embodiments, the flow statistics data that is collected, filtered, and structured as discussed above allows for enhancement in flow statistics analysis. For example, as discussed above, the quality of collected flow statistics may be identified, and that quality may cause different flow statistics to be weighted differently by the flow analysis algorithms used by the flow analytics server subsystem 206b. Furthermore, system and user created flow policy profiles may be modified and saved as the system learns about flow behavioral characteristics of the network. The adaptive nature of the flow statistics analysis allows for the system management to be automated to adapt to flow statistic data-specific changes in the operating environment.

Figure 8D:
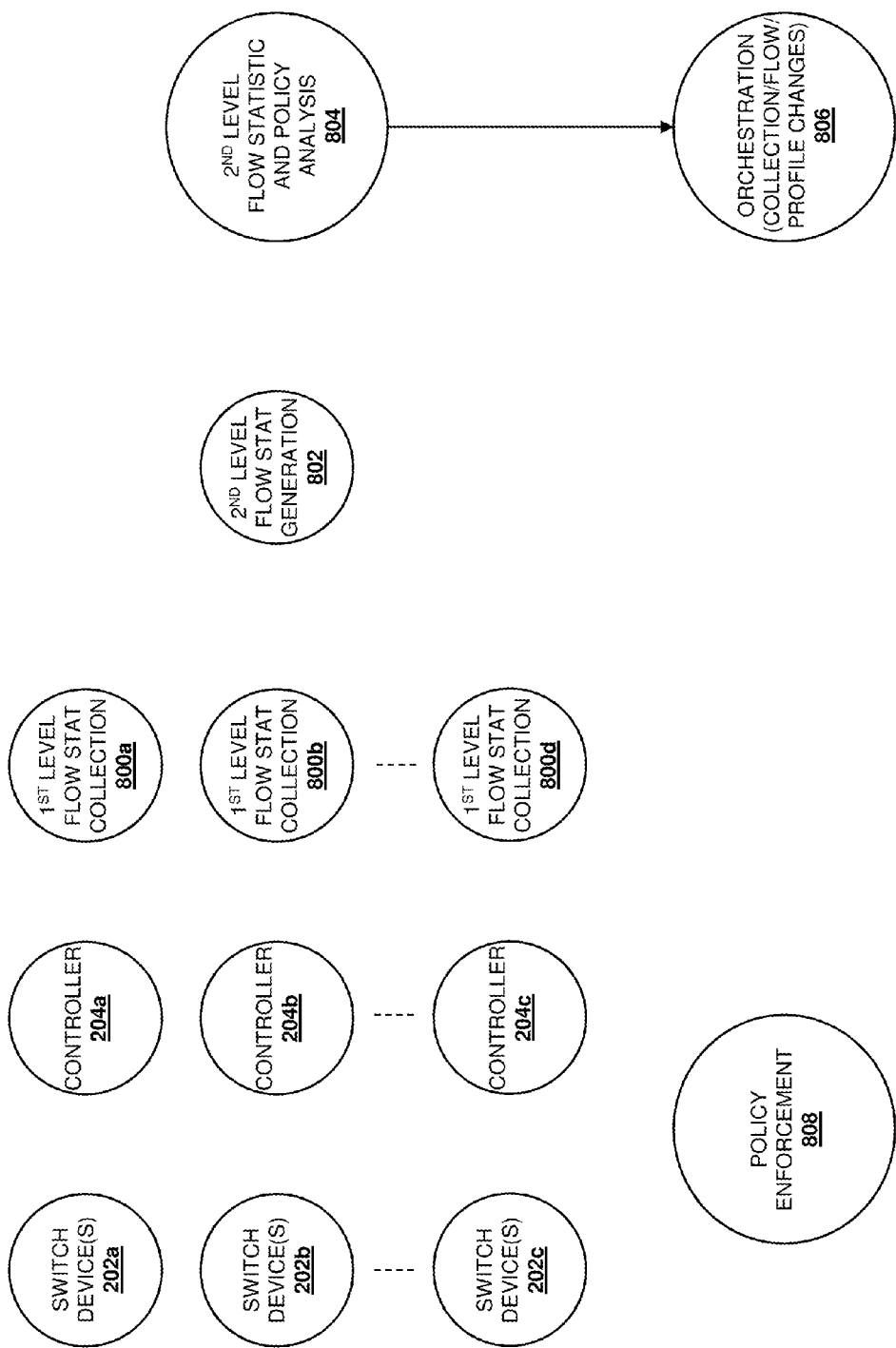
FIG. 8D is a schematic view illustrating collection/flow/profile changes by the flow management system of FIG. 2.
Figure 8E:
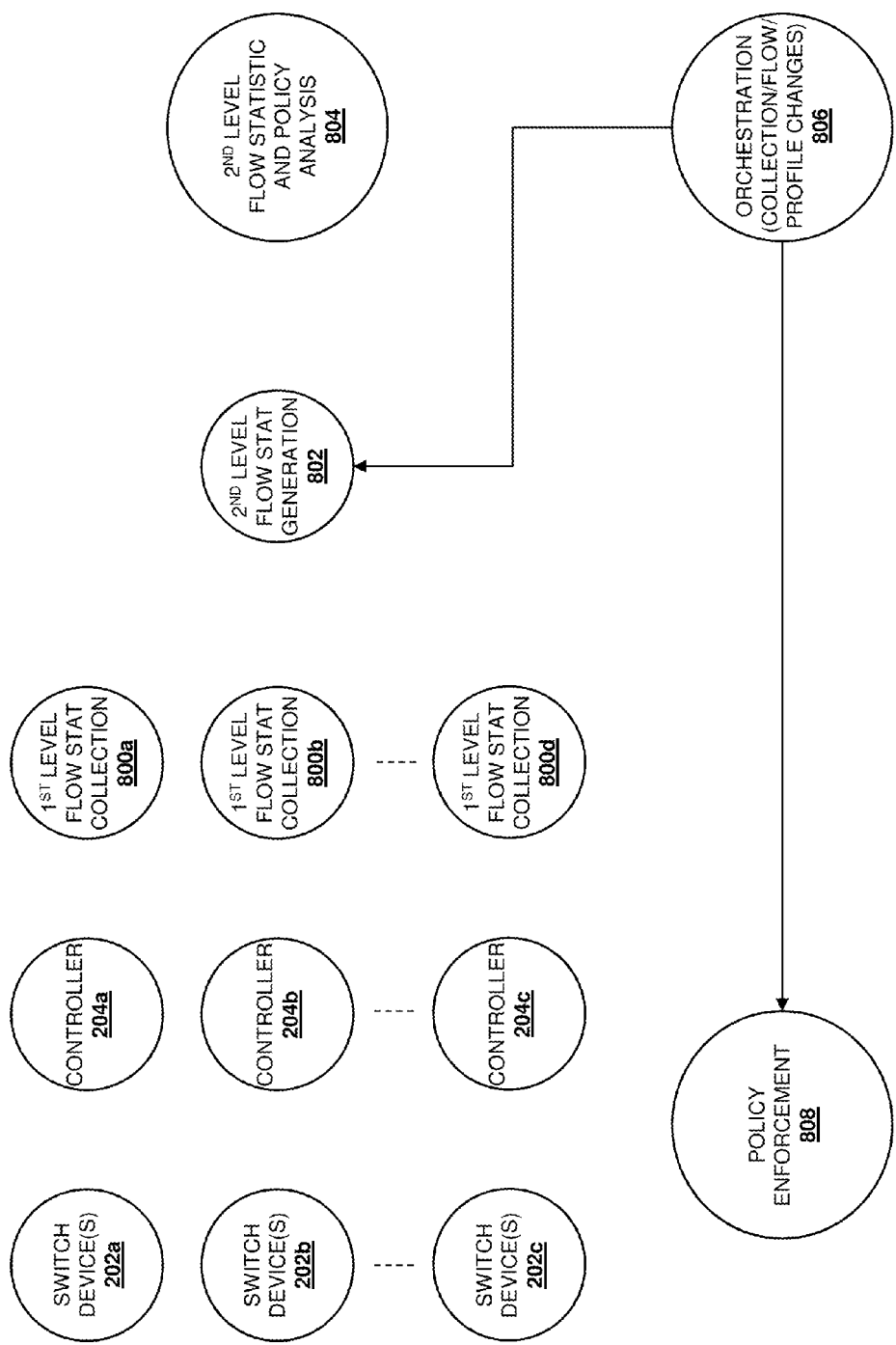
FIG. 8E is a schematic view illustrating collection/flow/profile changes being shared within the flow management system of FIG. 2.
Figure 8F:
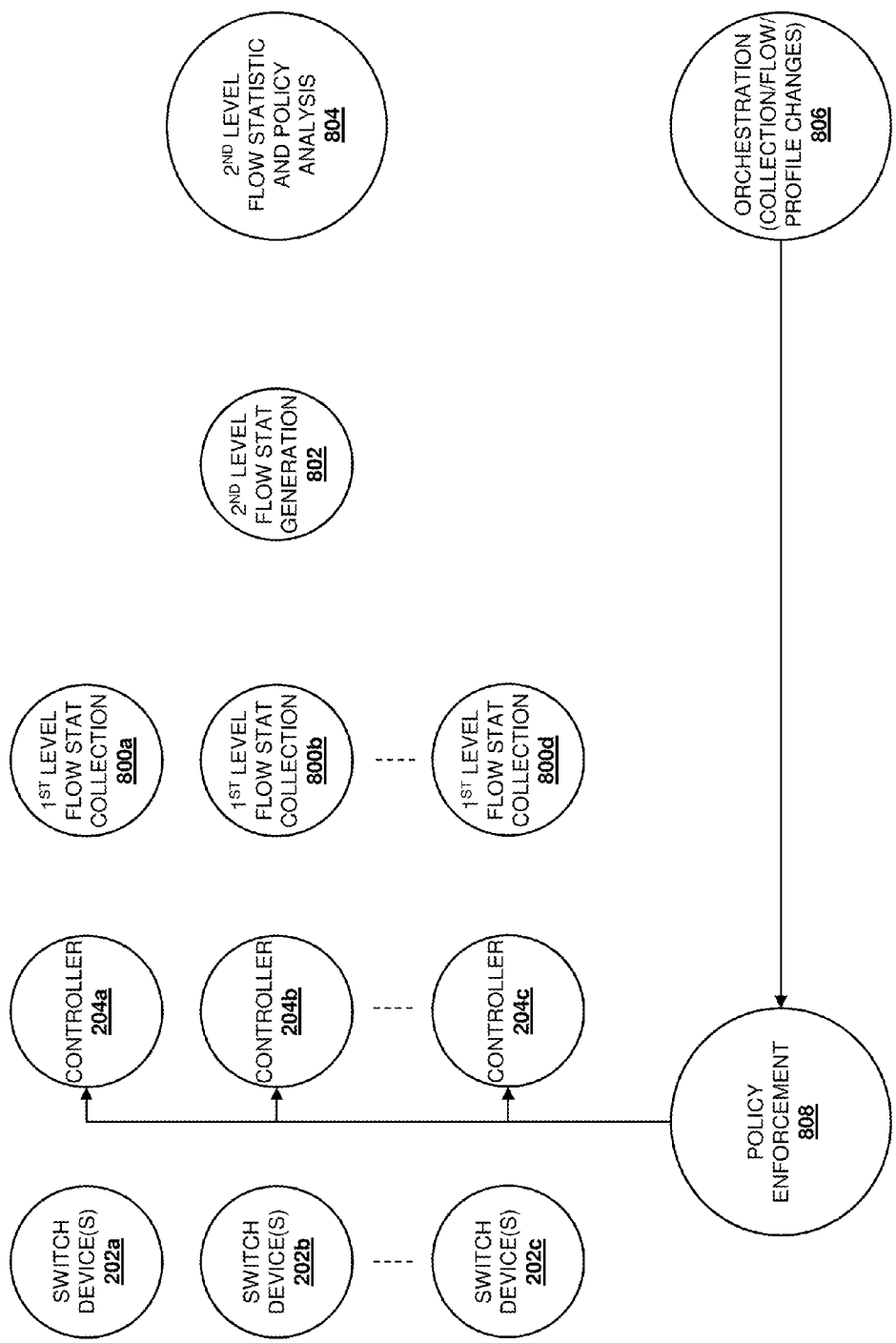
FIG. 8F is a schematic view illustrating policy enforcement by the flow management system of FIG. 2.

With reference to FIG. 8D, the method 700 then proceeds to block 708 where collection, flow, and/or policy information changes are determined. In an embodiment, at block 708, the orchestration engine 504 receives the second-level flow statistics and policy analysis from the flow analytics engine 404, and performs orchestration operations 806 to determine collection, flow, and/or profile changes. In an embodiment, the orchestration engine 504 may utilize the analysis performed at block 708 to determine at least one flow operation policy change to a current flow operation policy that is implemented in the switch device(s) 202a-c and that is configured to change that current flow operation policy (e.g., to modify a flow). In an embodiment, the orchestration engine 504 may utilize the analysis performed at block 708 to determine at least one flow statistics collection policy change to a current flow statistics collection policy that is implemented in the switch device(s) 202a-c and that is configured to change that current flow statistic collection policy (e.g., to cause the collection of different first-level flow statistics). In an embodiment, the orchestration engine 504 may utilize the analysis performed at block 708 to determine at least one flow statistics filtering policy change to a current flow statistics filtering policy that is implemented in the first-level flow statistics engine(s) 304a-c and that is configured to change that current flow statistic filtering policy (e.g., to change how first-level flow statistics are filtered). In an embodiment, the orchestration engine 504 may utilize the analysis performed at block 708 to determine at least one flow statistics structuring policy change to a current flow statistics structuring policy that is implemented in the second-level flow statistics engine 308 and that is configured to change that current flow statistic structuring policy (e.g., to change the structuring of filtered first-level flow statistics). In an embodiment, the orchestration engine 504 may utilize the analysis performed at block 708 to determine other policies changes that would be apparent to one of skill in the art in possession of the present disclsoure.

For example, based on the analysis of the second-level flow statistics and policies, the orchestration engine 504 may determine flow changes to change flows that are violating a flow policy such that the flow policy is no longer being violated. In another example, based on the analysis of the second-level flow statistics and policies, the orchestration engine 504 may determine flow changes to change flows that are violating thresholds such that the thresholds are no longer violated, and/or perform other flow changes to remedy issues in the network identified by the second-level flow statistics analysis. Similarly, based on the analysis of the second-level flow statistics and policies, the orchestration engine 504 may determine policy changes to change policies that are being violating by one or more flows if the network can handle the flows according to the policy change, determine threshold changes to change thresholds that are being violating by one or more flows if the network can handle the flows according to the threshold change, and/or perform other policy changes to remedy issues in the network identified by the second-level flow statistics analysis.

In a specific example, the policy changes for the flows utilized primarily by high frequency trade users may include monitoring and analyzing the policies for flows from a particular ingress port, along with a particular VLAN, that last less than a particular duration and changing the Quality of Service (QoS) of that flow based on the policy. In a specific example, if a particular Internet service level is being provided to a first high frequency trader at a first QoS level, and being provided to second high frequency trader at a second QoS level, and second high frequency trader is involved in a minimum number of flows with the same QoS as the first high frequency trader, the automated policy feedback algorithm may lower the QoS for the second high frequency trader and/or increase the QoS for the first high frequency trader based on the policy database rules. Such actions may cause those high frequency trading flows to increase or decrease in frequency, or to lengthen in duration. Similar actions for the flows utilized by video streaming users may include enforcing higher QoS on relatively longer duration flows for those associated with a particular input port and VLan that may cause those flows to experience less latency and a more consistent average flow duration.

In some embodiments, the orchestration engine 504 may receive analysis that identifies similar flows across different switch devices and, in response, notify a network administrator of those similar flows and/or create one or more policies to provide those flows along particular flow paths (e.g., a common flow path provided by common switch devices). For example, the orchestration engine 504 may receive analysis that identifies a common traffic type of a plurality of different flows, and create a policy in the policy/control database 506 that causes those plurality of different flows (e.g., flows having that traffic type) along a common flow path provided by common switch devices. Furthermore the orchestration engine 504 may enforce existing policies in the policy/control database 506 such as policies that define service level agreements, and as a result may move flows around the network (e.g., to flow paths provided by particular switch devices), throttle flows, provide flow priorities, and/or perform other flow changes based on the existing policies. Further still, the orchestration engine 504 may create policies for flows based on desired characteristics of the network. For example, a network administrator may not want any link in the network to be utilized over 85% of its maximum bandwidth, but customers with service level agreements may require high bandwidth usage, and the orchestration engine 504 may create policies that conform to those two requirements. As such, the orchestration engine 504 may use the second-level flow statistics and policy analysis to adapt and direct flows dynamically to most efficiently use the network based on a global view of those flows, policies, and the network.

In an embodiment, the flow analytics server subsystem 206b and the flow policy/control server subsystem 206c provide an intelligent feedback mechanism that performs flow statistics analysis on attributes of flows, and produces recommended changes to flows and flow policies. Such feedback provides the ability of the flow management server system 206 to provide network topology analysis and recommended network topology changes, flow pattern analysis over time and events that provides for the derivation of data that may be translated into specific flow movement recommendations, and the generation of flow policy statistics (e.g., a number of flows being rejected or accepted, end device issues, latency numbers, constricted bandwidth, downstream problems, etc.) that allow for real-time recommended changes to the flow policy and thus automated tuning capabilities. In a specific example, the detection of at least one flow pattern in a plurality of flows may allow for the determination of flow operation policy changes that are configured to modify those flow pattern(s). In another specific example, the determination of common flow characteristics for flows that are provided along different flow paths may result in the determination of flow operation policy changes that are configured to cause those flows to be provided along a common flow path via the switch devices 202a-c.

In many embodiments, the flow statistics analysis performed on derived flow statistics (e.g., second-level flow statistics) may take adaptive flow statistics into account, including the weighting of flow statistics collected by different switch devices, metadata about the flows themselves, and/or other derived data that is produced from the raw flow statistic data (e.g., the first-level flow statistics). Furthermore, flow modification recommendations from the flow analysis may be used for both flow policy enforcement and SDN performance modification via autotuning functionality of the system. For example, flow-programmable characteristics of the system can be tuned based on attributes such as traffic class, ethertype, source and destination addresses, latency, bandwidth, and/or system or user-provided flow or policy modifications, which allows for the automatic flow and policy adjustment mechanisms of the flow management server system 206. Flow policies may then be modified in real time by the system by taking advantage of statistical trend analysis of flow data and resulting changes pushed to the controllers 204a-c. Users may also modify characteristics of algorithms in the flow analytics server subsystem, make changes to the policy databases and algorithms for managing flow policies, and make changes to the flow modification settings.

With reference to 8E and 8F, the method 700 then proceeds to block 710 where policy information is distributed and policies are enforced. In an embodiment, at block 710, the orchestration engine 504 provides policy changes to the second-level flow statistics engine 308 in the flow statistics server subsystem 300, and to the policy enforcement engine 604 in the policy enforcement server subsystem 600. For example, the orchestration engine 504 may provide flow information collection, filtering, and/or structuring policy changes to the second-level flow statistics engine 308, which may communicate those flow information collection policy changes through the first-level flow statistics engines 304a-c to cause their respective controllers 204a-c to change the first-level flow statistics they collect from their respective subsets of switch devices 202a-c, to cause the first-level flow statistics engines 304a-c to change their first-level flow statistics filtering operations, and to cause the second level flow statistics engine 308 to change its filtered first-level flow statistics structuring operations.

Furthermore, the policy enforcement engine 604 may provide flow operation policy changes to each of the controllers 204a-c to cause those controllers 204a-c to modify the operation of their respective subsets of switch devices 202a-c to change flow operations performed by those switch devices to implement any policy change determined as discussed above. For example, the policy enforcement engine 604 may distribute at least one updated flow operations policy that includes the flow operation policy change(s) to the controller(s) 204a-c for provisioning to the switch device(s) 202a-c in order to cause the switch device(s) to perform different flow operations on their flows. Similarly, the policy enforcement engine 604 may distribute at least one updated flow statistics collection policy that includes the flow statistics collection policy change(s) to the controller(s) 204a-c for provisioning to the switch device(s) 202a-c in order to cause the switch device(s) to collect different first-level flow statistics; the policy enforcement engine 604 may distribute at least one updated flow statistics filtering policy that includes the flow statistics filtering policy change(s) to the first-level flow statistics engines 304a-c in order to cause the first-level flow statistics engines 304a-c to filter first-level flow statistics differently; and the policy enforcement engine 604 may distribute at least one updated flow statistics structuring policy that includes the flow statistics structuring policy change(s) to the second-level flow statistics engine 308 in order to cause the second-level flow statistics engine 308 to structure filtered first-level flow statistics differently. As such, as policies and policy changes are created and applied, particular flow statistics may be collected about the results of applying a policy or policy change to the network, and those flow statistics may be compared to the desired effect of a policy or policy change to determine how to further adjust policies.

In some embodiments, the policy/control database 506 may include rules for the orchestration engine 504 that cause the orchestration engine 504 to adjust policies if the results of a policy are not the desired effect of that policy but are within a threshold. For example, flow operation policy changes may be designed to produce at least one flow result, and the updated/modified flow operations conducted by the switch device(s) 202a-c may be monitored to determine whether they are providing that at least one flow result. As such, policy creation and modification may be adjusted to create policies based on the results of flow statistics collection, and flow statistics collection may be adjusted to collect, structure, and/or weigh flow statistics differently based on the result of applying policies or policy changes. Such adjustments provide for the collection of more pertinent information about what may be causing an applied policy to not accomplish its goal, and then adjust that policy to accomplish that goal. In other embodiments, flow statistics collection may also be adjusted to collect more information about flows of interest such as, for example, service level agreement links, possible network security issues, etc. Thus, data collection, data analysis, and policy creation may be performed to compensate for deltas in the applied policies, desired results, and flows of interest in order to provide a network that operates as desired by a network administrator.

As such, the policy enforcement engine 604 converts the policy-based flow modifications determined by the flow policy/control server subsystem 206c into instructions that are executable by the controllers 204a-c (e.g., SDN OPEN-FLOW® controller instructions), which allows the modifications to be applied to realize policy and flow changes, and sets up the feedback loop discussed above that provides for the monitoring of flow statistics to determine whether those changes have provided a desired result. Thus, dynamic, intelligent, and adaptive flow information is converted into specific controller instructions for optimizing the network flows.

Thus, a network flow management system has been described that provides for a global view of flows in a network via the collection of first-level flow statistics and their use in generating second-level flow statistics. That global view may then be analyzed (e.g., via the analysis of the second-level flow statistics) to identify whether flows and flow policies are provided desired network behavior and, if not, the flows and/or flow policies may be modified to realize that desired network behavior. A feedback loop is provided where second-level flow statistics are analyzed to identify flows and flow policies that may not be providing desired network behavior, and then flow collection, filtering, and structuring policies are modified to focus the global view on flows and flow policies of interest, while modifying those flows and flow policies to attempt to realize the desired network behavior. As such, as flows and flow policies are identified, focused information may be retrieved about those flows and flow policies, and small detailed changes may be made to the flows and flow policies, thus automating the tuning of the network flows to manage them in a way that provides the desired network behavior without requiring constant supervision by a network administrator.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A network flow management system, comprising:
   a plurality of switch devices;
   a plurality of controllers, wherein each of the plurality of controllers is coupled to a subset of the plurality of switch devices; and
   a flow management server system that is coupled to each of the plurality of controllers, wherein the flow management server system is configured to:
   collect first-level flow information for the plurality of switch devices from the plurality of controllers;
   filter and structure the first-level flow information to generate second-level flow information;
   analyze the second-level flow information based on at least one current flow operation policy that is configured to cause the plurality of switch devices to perform first flow operations and, in response, determine at least one flow operation policy change; and
   distribute at least one updated flow operation policy that includes the at least one flow operation policy change to each of the plurality of controllers, wherein the at least one updated flow operation policy is configured to cause the plurality of switch devices to perform second flow operations that are different than the first flow operations.

2. The network flow management system of claim 1, wherein the first-level flow information is collected, filtered, and structured using at least one current flow information collection policy, and wherein the flow management server system is configured to:

analyze the second-level flow information and, in response, determine at least one flow information collection policy change; and distribute at least one updated flow information collection policy that includes the at least one flow information collection policy change to each of the plurality of controllers, wherein the at least one updated flow information collection policy is configured to cause at least one change to the collection, filtering, or structuring of the first-level flow information.

3. The network flow management system of claim 2, wherein the at least one flow information collection policy is configured to cause the collection of different first-level flow statistics associated with a particular flow.

4. The network flow management system of claim 1, wherein the structuring of the first-level flow information to generate the second-level flow information includes:

identifying at least one flow that has violated at least one flow operation policy.

5. The network flow management system of claim 1, wherein the analyzing the second-level flow information and, in response, determining at least one flow operation policy change includes:

detecting at least one flow pattern in a plurality of flows, wherein the at least one flow operation policy change is configured to modify the at least one flow pattern.

6. The network flow management system of claim 1, wherein the analyzing the second-level flow information and, in response, determining at least one flow operation policy change includes:

determining that a first flow that is provided along a first flow path by a first subset of the plurality of switch devices has common flow characteristics with a second flow that is provided along a second flow path by a second subset of the plurality of switch devices, wherein the at least one flow operation policy change is configured to cause the first flow and the second flow to be provided along a common flow path provided by the plurality of switch devices.

7. The network flow management system of claim 1, wherein the at least one flow operation policy change is associated with at least one flow result, and wherein the flow management server system is configured to:

monitor the second flow operations performed by the plurality of switch devices and determine whether the second flow operations are providing the at least one flow result.

8. An information handling system (IHS), comprising:
a communication system that is configured to couple to a plurality of controllers that are each coupled to at least one switch device;
a processing system that is coupled to the communication system; and
a memory system that is coupled to the processing system and that includes instruction that, when executed by the processing system, cause the processing system to perform operations including:
collecting first-level flow information for the plurality of switch devices from the plurality of controllers;
filtering and structuring the first-level flow information to generate second-level flow information;
analyzing the second-level flow information based on at least one current flow operation policy that is configured to cause the plurality of switch devices to perform first flow operations and, in response, determining at least one flow operation policy change; and
distributing at least one updated flow operation policy that includes the at least one flow operation policy change to each of the plurality of controllers, wherein the at least one updated flow operation policy is configured to cause the plurality of switch devices to perform second flow operation that are different than the first flow operations.

9. The IHS of claim 8, wherein the first-level flow information is collected, filtered, and structured using at least one current flow information collection policy, and wherein the operations include:

analyzing the second-level flow information and, in response, determining at least one flow information collection policy change; and distributing at least one updated flow information collection policy that includes the at least one flow information collection policy change to each of the plurality of controllers, wherein the at least one updated flow information collection policy is configured to cause at least one change to the collection, filtering, or structuring of the first-level flow information.

10. The IHS of claim 9, wherein the at least one flow information collection policy is configured to cause the collection of different first-level flow statistics associated with a particular flow.

11. The IHS of claim 8, wherein the structuring of the first-level flow information to generate the second-level flow information includes:

identifying at least one flow that has violated at least one flow operation policy.

12. The IHS of claim 8, wherein the analyzing the second-level flow information and, in response, determining at least one flow operation policy change includes:

detecting at least one flow pattern in a plurality of flows, wherein the at least one flow operation policy change is configured to modify the at least one flow pattern.

13. The IHS of claim 8, wherein the analyzing the second-level flow information and, in response, determining at least one flow operation policy change includes:

determining that a first flow that is provided along a first flow path by a first subset of the plurality of switch devices has common flow characteristics with a second flow that is provided along a second flow path by a second subset of the plurality of switch devices, wherein the at least one flow operation policy change is configured to cause the first flow and the second flow to be provided along a common flow path provided by the plurality of switch devices.

14. A method for network flow management, comprising:
collecting, by a flow management server system from a plurality of controllers that are each coupled to a subset of a plurality of switch devices, first-level flow information for the plurality of switch devices;
filtering and structuring, by the flow management server system, the first-level flow information to generate second-level flow information;
analyzing, by the flow management server system, the second-level flow information based on at least one current flow operation policy that is configured to cause the plurality of switch devices to perform first flow operations and, in response, determining at least one flow operation policy change; and distributing, by the flow management server system to each of the plurality of controllers, at least one updated flow operation policy that includes the at least one flow operation policy change, wherein the at least one updated flow operation policy is configured to cause the plurality of switch devices to perform second flow operation that are different than the first flow operations.

15. The method of claim 14, wherein the first-level flow information is collected, filtered, and structured using at least one current flow information collection policy, and wherein the method includes:

analyzing, by the flow management server system, the second-level flow information and, in response, determining at least one flow information collection policy change; and distributing, by the flow management server system to each of the plurality of controllers, at least one updated flow information collection policy that includes the at least one flow information collection policy change, wherein the at least one updated flow information collection policy is configured to cause at least one change to the collection, filtering, or structuring of the first-level flow information.

16. The method of claim 15, wherein the at least one flow information collection policy is configured to cause the collection of different first-level flow statistics associated with a particular flow.

17. The method of claim 14, wherein the structuring of the first-level flow information to generate the second-level flow information includes:

identifying, by the flow management server system, at least one flow that has violated at least one flow operation policy.

18. The method of claim 14, wherein the analyzing the second-level flow information and, in response, determining at least one flow operation policy change includes:

detecting, by the flow management server system, at least one flow pattern in a plurality of flows, wherein the at least one flow operation policy change is configured to modify the at least one flow pattern.

19. The method of claim 14, wherein the analyzing the second-level flow information and, in response, determining at least one flow operation policy change includes:

determining, by the flow management server system, that a first flow that is provided along a first flow path by a first subset of the plurality of switch devices has common flow characteristics with a second flow that is provided along a second flow path by a second subset of the plurality of switch devices, wherein the at least one flow operation policy change is configured to cause the first flow and the second flow to be provided along a common flow path provided by the plurality of switch devices.

20. The method of claim 14, wherein the at least one flow operation policy change is associated with at least one flow result, and wherein the method includes:

monitoring, by the flow management server system, the second flow operations performed by the plurality of switch devices and determining whether the second flow operations are providing the at least one flow result.

* * * * *